Figure 1:
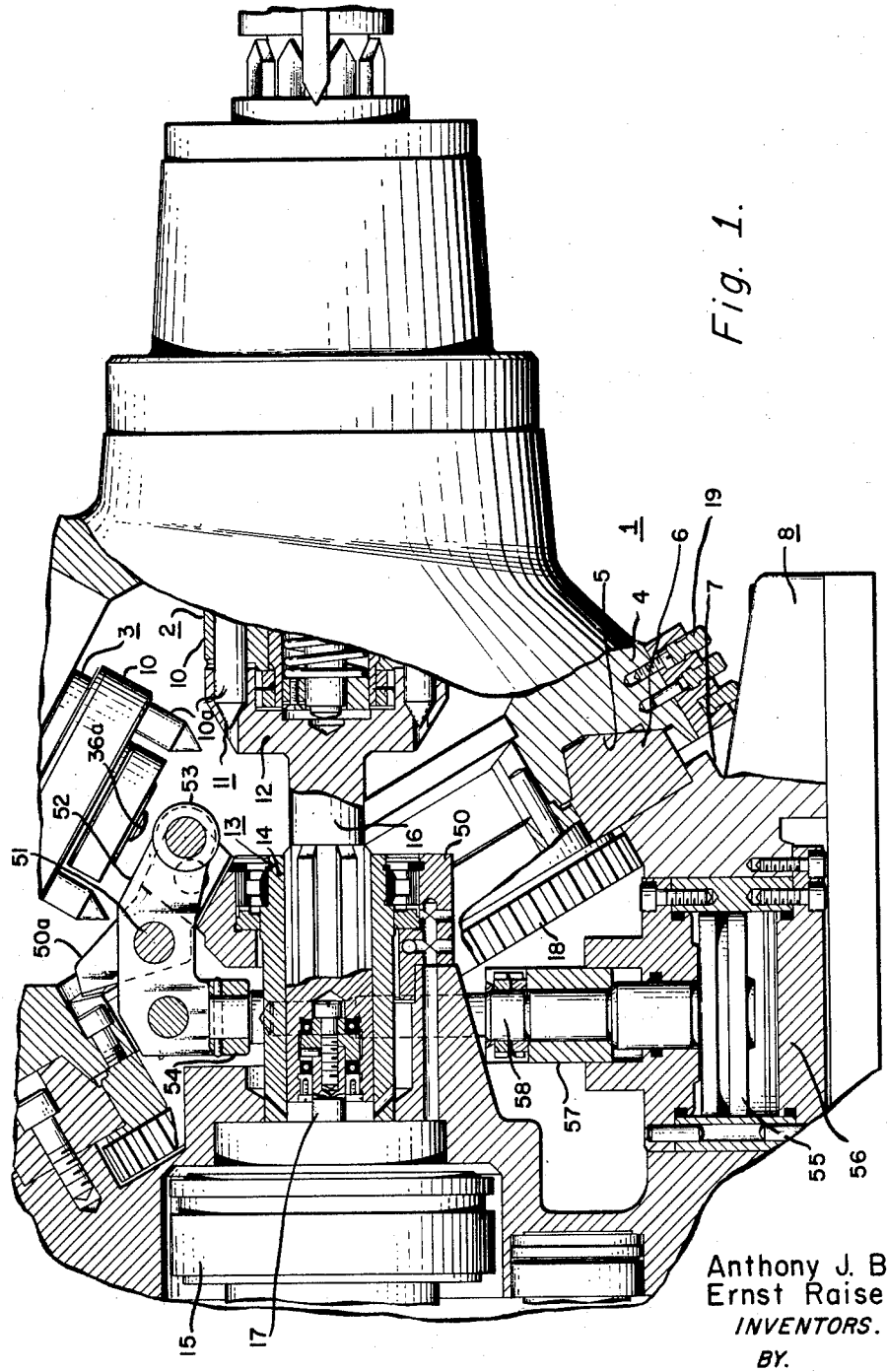

Sept. 29, 1964   A. J. BUDDEN ETAL   3,150,878
HOLLOW SPINDLE TOOL CLAMP
Filed Sept. 25, 1961   2 Sheets-Sheet 1

Anthony J. Budden,
Ernst Raiser
INVENTORS.
BY.

AGENT.

3,150,878
HOLLOW SPINDLE TOOL CLAMP
Anthony James Budden, Los Angeles, Calif., and Ernst Raiser, Hanfgartenstrasse 7, Rommelsbach, Kreis Reutlingen, Germany; said Budden assignor to Hughes Aircraft Company, Culver City, Calif., a corporation of Delaware
Filed Sept. 25, 1961, Ser. No. 141,263
5 Claims. (Cl. 279—9)

This invention relates generally to automatic machine tools, and more particularly to automatic machine tools incorporating facilities providing rapid engagement and release of one member by another member.

In some types of automatic machine tools facilities are provided for interchanging cutting tools between a cutting tool magazine and a spindle of the machine tool. In arrangements of this type it is necessary that such a tool interchanging facility operate quite rapidly to minimize the inactive time of the machine during a complete cycle of machining operations on a particular workpiece. A machine tool of this type is usually equipped with a tool handler of some sort which operates between the tool magazine and the tool spindle and which is capable of engaging and releasing tools for the purpose of interchanging tools between the tool magazine and the tool spindle.

Since the cutting tool must be tightly secured in the tool spindle during a machining operation, a spindle chuck or clamp assembly is needed which accurately and firmly secures the cutting tool for machining purposes and which is fast acting in clamping and releasing the cutting tool for tool exchanging purposes.

Several tool exchanging arrangements are available in machine tools of the general class referred to hereinabove. Sometimes these involve a conventional chuck arrangement with facilities for rotating the spindle while the chuck operating member is grasped by a suitable clamp. In other instances such arrangements may involve a tapered tool shank terminating in a screw thread mating with a complementary chuck. This has the advantage over the conventional chuck arrangement above in that no extra facility for grasping a chuck operating member is required, although here again the spindle must be rotated or operated to secure the cutting tool.

It is essential in arrangements of this type that certain conditions be met in engaging a cutting tool in a tool spindle. Important among these requirements are proper seating of the tool shank in a fixed axial position in the tool holder in the spindle, proper centering of the tool shank in reference to the spindle axis, and secure mounting of the tool to prevent rotation of the tool relative to the spindle.

In the first of the items named hereinabove, proper axial positioning of the tool shank in the tool clamp or chuck in an automatic tool is essential. In order to permit accurate programming of the distance through which a particular machining operation is to take place, for example, the precise point at which a slot is to be milled, or a precise depth to which a hole is to be drilled, or at which counterboring operation is to take place, the exact position of the end of the tool with reference to the spindle or the carriage must be known.

With respect to the second item, tool eccentricity results in inaccurate machining and may result in damage to the machine tool, to the cutting tool and certainly to the part upon which the work is being performed. With reference to the third item, it is essential that rotation of the tool shank in the spindle be prevented to avoid damage to the tool, damage to the tool clamps or chucks and, again, avoid the possibility of damage to the part upon which work is being performed.

One object of this invention is to provide a tool chuck or clamp which is simple with respect to operating requirements and which is positive in operation.

Another object of this invention is to provide a tool chuck or a clamp which is quick-acting and which is secure.

A further object of this invention is to provide a tool clamp or chuck which is essentially selfclamping and selfcentering.

It is also an object of this invention to provide a tool clamp or tool chuck which requires no spindle rotation or spindle operation, or rotation of any parts associated therewith for clamping purposes.

The aforesaid and other objects and advantages are accomplished in a tool clamp or chuck incorporating facilities for keying and for radially and axially clamping a cutting tool shank.

Keying is accomplished in the provision of suitable slots and key members on the cooperating parts of the tool spindle and the cutting tool shank.

Radial clamping is accomplished in the provision of a bellows-shaped, circular clamp having interconnecting or engaging circumferential sloping surfaces providing external and internal peripheral edges which are radially displaced by the application of a compression force axially of the arrangement.

Axial clamping is accomplished in the provision of suitable gripping means engaging a complementary portion of a cutting tool shank and arranged to draw the cutting tool shank completely into the bellows-shaped cylindrical clamp into a properly seated position.

The radial and axial clamping mechanisms are actuated in suitable sequence to permit axial positioning and seating of the cutting tool shank prior to radial clamping by means of a suitable motion translation mechanism connected to both the radial clamping and axial seating mechanisms and operable between positions releasing both of said mechanisms and actuating both of said mechanisms in the sequence named.

Figure 2:
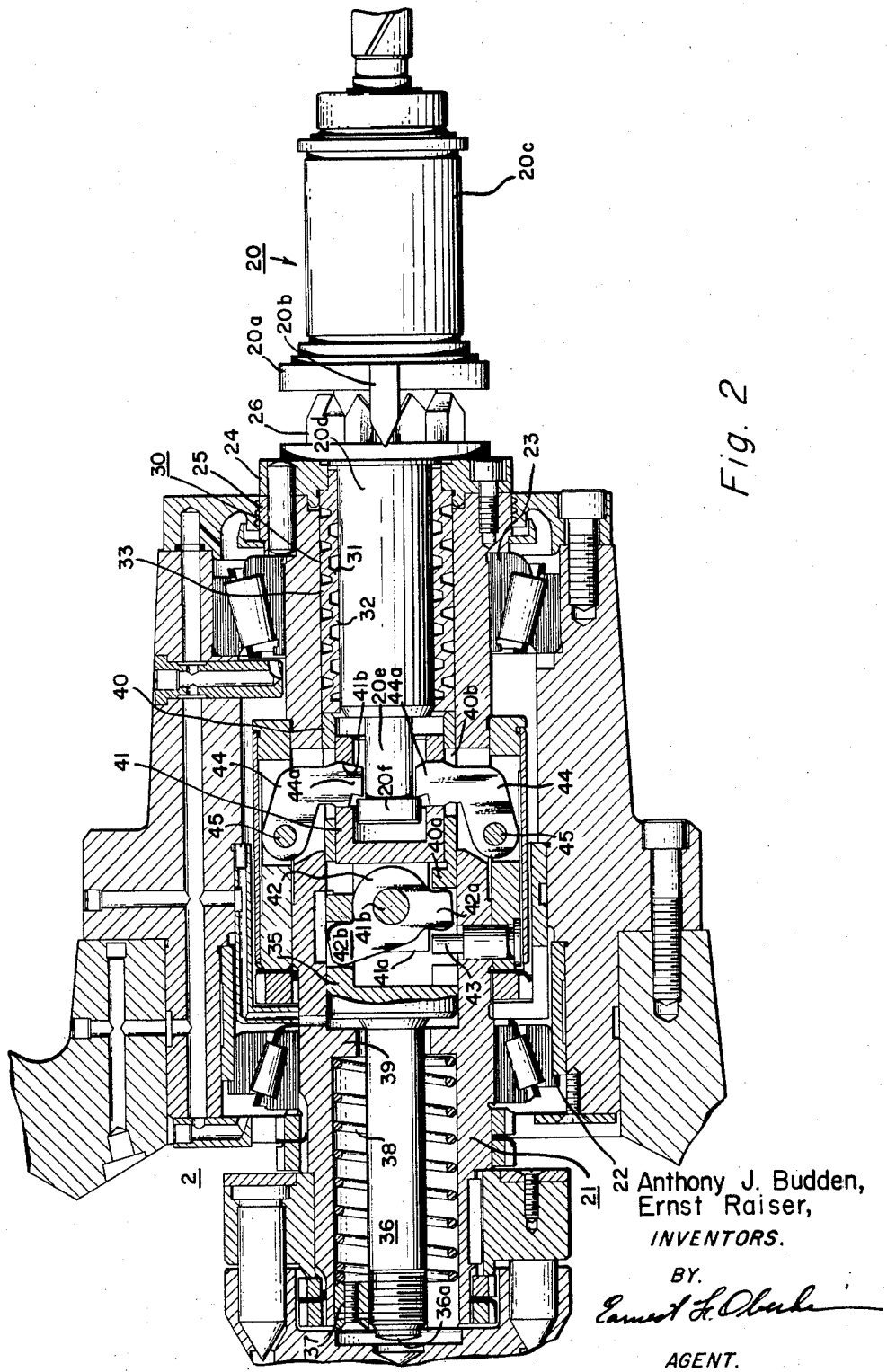

Additional objects and advantages will be apparent from a study of the following specification when considered in conjunction with the accompanying drawings in which:

FIG. 1 is a fragmentary sectional view of an automatic machine tool embodying the principles of this invention; and FIG. 2 is an enlarged sectional view of the tool clamp or chuck assembly employed in the machine tool arrangement of FIG. 1.

The machine tool arrangement fragmentarily illustrated in FIG. 1 comprises a dual spindle assembly generally designated 1. This dual spindle assembly which rotatably mounts respective spindles 2 and 3 is provided with a circular base section 4 provided with a circular groove 5 which slidably engages a circular track or way 6. Circular track 6 is secured to a sloping face 7 of a tool carriage, generally designated 8, in which position the dual spindle assembly is supported for rotating respective spindle assemblies between active and inactive spindle positions. As will be seen by reference to FIG. 1, the axes of rotation of tool spindles 2 and 3 are disposed at an angle to one another. The plane of the circular track 6 is substantially perpendicular to the bisector of the angle between the axes of the two spindles defining an axis between the spindles about which the dual spindle assembly rotates.

In the illustration in FIG. 1, for the instant position of the dual spindle assembly, the spindle 2 is the active spindle and the spindle 3 is the inactive spindle. Spindle 2 terminates in a clutch member 10 forming part of a separable jaw-type of clutch, generally designated 11, which comprises a complementary chuck member 12. Chuck member 10 includes a plurality of circumferentially spaced axially rearwardly projecting pins 10a which engage cooperating holes in clutch member 12. Clutch member 12 forms part of a power shaft assembly 13 including a tubular power shaft 14 powered by a suitable transmission comprising conventional disc plate types of clutches 15 and suitable gearing (not shown) affording selections of spindle speeds and permitting reversal of spindle rotation.

The tubular power shaft 14 is internally splined at its forward end and receives an externally splined power shaft section 16 which mounts clutch member 12. The splines on this telescoping section of the power shaft 13 are sufficiently long to permit withdrawal of the clutch member 12 to the left, as viewed, a distance which is sufficient to disengage the holes of clutch member 12 from the pins 10a of clutch member 10 of the separable clutch assembly. The details of the mechanism whereby this axial displacement of the power shaft section 16 and clutch member 12 is accomplished are not shown in the interest of simplicity. This mechanism, however, includes in part an actuating rod 17 coaxially disposed on and connected to shaft section 16 and which may be actuated by any suitable means including suitable piston type hydraulic actuators. In this connection, and for further and other details reference may be made to a copending application of W. C. Leone et al., Serial No. 135,936, filed September 5, 1961, entitled Machine Tool, and assigned to the assignee of this invention, and which also shows the structure of this invention.

Rotation of the dual spindle assembly for moving spindles 2 and 3 between active and inactive positions may be accomplished by any suitable means. That illustrated herein and in said copending application involves an externally toothed ring gear, herein designated 18, which is secured to the circular base 4 of the dual spindle assembly in a position concentric with the axis of rotation of this assembly. A suitable pinion, not illustrated herein, powered by any suitable type of motor, including a hydraulic motor, may be used to rotate the spindle assembly between its two angular positions. These positions may be identified by means of switches (not shown) actuated by cams 19 mounted externally of the circular base of the dual spindle assembly. Here also additional details of this apparatus may be had by reference to the copending application aforesaid.

The respective spindle assemblies 2 and 3 are identical. FIG. 2 illustrates spindle assembly 2 in full section showing the mounting of a cutting tool assembly 20 in the tool clamp or the tool chuck of the tool spindle.

This spindle assembly, which is a rotatable hollow spindle assembly, comprises a tubular spindle shaft, generally designated 21, which is rotatably mounted in bearing assemblies 22 and 23 in axially spaced positions in the housing section for this spindle assembly. The right end or the front end of tubular spindle shaft assembly 21 terminates in a plate 24 which is pinned or otherwise suitably secured to a flanged portion 25 of the forward end of the tubular spindle shaft and which is equipped with circumferentially spaced, axially projecting teeth 26 terminating, respectively, on their right ends, as viewed, in points. Cutting tool assembly 20 comprises a flange 20a provided with a projection or key 20b, which is adapted to fit between respective teeth 26. Key 20b is also provided with a pointed extremity whence displacement of cutting tool assembly 20 from the right to left, as viewed, in a direction to engage key 20b in the slots between the teeth 26 will normally result in some slight caming action in the pointed ends of the projecting teeth and the key to angularly displace the cutting tool assembly as it is being inserted into the open end of the spindle. This facility positively keys the cutting tool assembly to the spindle to provide a positive rotational drive for the cutting tool.

As illustrated and described in the copending application aforesaid, a tool exchanging mechanism incorporates a suitable cutting tool handler for interchanging cutting tool assemblies 20 between a tool magazine and the inactive tool spindle. The cutting tool handler engages a section 20c of the cutting tool assembly and when in position axially aligned with the axis of the inactive spindle is operated to insert the cutting tool shank 20d into the spindle. The cutting tool shank 20d includes an extension 20e which terminates in a flange 20f of lesser diameter than the shank portion 20d.

As seen in FIG. 2, shank portion 20d of the cutting tool assembly fits within a bellows-shaped clamp 30, being inserted from the tool receiving end of the clamp adjacent the outer end of the spindle. The bellows-shaped clamp 30 is provided with interconnecting, angularly displaced, annular sections 13 defining inner and outer peripheral faces 32 and 33 respectively. The radial dimension between the inner and outer circumferential faces 32 and 33, when the bellow-shaped clamp is axially unstressed, is slightly less than the radial dimension between the surfaces of cutting tool shank 20d and the internal bore of tubular spindle 21. Hence, when the bellow-shaped clamp 30 is axially unstressed, the shank 20d of a cutting tool may be neatly fitted therein.

The tool clamp assembly additionally includes a cylindrical actuator, or the first hollow clamp member, 35 provided with an actuating rod 36 projecting from the back face thereof and terminating in a threaded section which mounts a plate or washer 37. A compression spring 38 is compressed between the washer 37 and an inwardly formed shoulder 39 within the tubular spindle 21. Compression spring 38 therefore provides a bias on the cylindrical actuator 35 normally acting toward the left, as viewed in FIG. 2. The threaded end of actuating rod 36 terminates in an actuating surface 36a which may be engaged by suitable actuating means, yet to be described, to effect displacement of the actuating rod and, hence, also the cylindrical actuator 35 towards the right as viewed in FIG. 2. A clamp compressing sleeve, or second hollow clamp member 40 is slidably fitted within the tubular spindle 21 and is provided with a forward edge engaging in the back edge of the bellows-shaped clamp 30. Clamp compressing sleeve 40 is disposed in a position axially displaced from the cylindrical actuator 35. A cup-shaped actuator member 41 is slidably mounted within the clamp compressing sleeve 40 and is provided with a pair of spaced brackets 41a on the back face thereof mounting a pivot pin 41b, in turn pivotally mounting a lever 42. Lever 42 is provided with a lower projection 42a which projects between a shoulder 40a on the back edge of clamp compressing sleeve 40 and a pin 43 mounted in the wall of the tubular spindle 21. An upper projection 42b on lever 42 projects into a slot in cylindrical actuator 35. Identical levers 44 (sometimes referred to in the claims as movable tool shank engaging members) are pivotally mounted on pins 45 in suitable slots in tubular spindle 21 and are provided with inwardly projecting extremities 44a which project through slots in both the clamp compressing sleeve 40 and the cup-shaped actuator member 41 into a position engaging cooperating portions of the tool shank represented in reduced diameter flange 20f on extension 20e on cutting tool assembly 20, to apply an axial bias thereto in a direction drawing the cutting tool shank 20d into the tool clamp. The slots in the clamp compressing sleeve 40 and the cup-shaped actuator member are designated, respectively, 40b and 41b.

Lever 42, cup-shaped member 41 and levers 44 constitute a mechanical linkage means interconnecting the hollow clamp members, i.e., cylindrical actuator 35 and clamp compressing sleeve 40. Clamping action is obtained when cup-shaped actuator member 41 is moved to the left as viewed, in which circumstances the forward edges of slots 41b engage the cooperating edges of levers 44 affecting rotation of these levers about their respective pivot pins in a direction to move the lever extremities to the left, as viewed, to engage flange 20f. Movement of cup-shaped actuator member 41 to the right, as viewed, results in displacement of levers 44 about respective pivots 45 in a direction to move extremities 44a radially outwardly and forwardly to completely disengage flange 20f and to clear the peripheral edge of this flange so that the cutting tool may be withdrawn.

For the purpose of this discussion, assume that actuating rod 36 has been displaced to the right, as viewed. In this condition actuator 35 is displaced to the right rotating lever 42 clockwise. Since projection 42a of lever 42 is effectively held captive between shoulder 40a and pin 43, it will be seen that lever 42 rotates clockwise under this condition and in so doing displaces pin 41b to the right, driving cup-shaped actuator member 41 therewith. The extremities of levers 44a now swing forwardly and radially outwardly releasing and clearing flange 20f. At the same time, since the only loads acting upon lever 42 at this point are essentially friction loads, actuating biases are almost entirely removed from clamp compressing sleeves 40. The bellows-shaped clamp 30 therefore extends toward its normally unstressed axial condition and in so doing the inner peripheral edges are radially displaced outwardly a distance sufficient to just release and clear the tool shank 20d. In this condition therefore the cutting tool assembly may be easily removed from the clamp, or a cutting tool assembly may be inserted in the tool clamp.

Release of the force applied to the end 36a of actuating rod 36 results in displacement of cylindrical actuator 35 to the left as a consequence of the loading provided by spring 38. Projection 42b of lever 42 is pulled to the left as viewed rotating lever 42a counter-clockwise about its lower projection 42. Pin 41b is displaced to the left as viewed carrying with it cup-shaped actuator member 41. The extremities 44a of levers 44 are moved downwardly into a position engaging the face of flange 20f, insuring proper seating of the cutting tool assembly in the tool clamp. At such time as movement of flange 20f in an axial direction is arrested by seating of the cutting tool assembly in the clamp, motion of cup-shaped actuator member 41 ceases. Continued force and/or displacement on projection 42b by the loading of spring 38 biases projection 42a against shoulder 40a of clamp compressing sleeve 40. Sleeve 40 is therefore strongly biased to the right as viewed axially compressing bellows-shaped clamp 30 forcing the inner peripheral edges or faces 32 of the bellows-shaped clamp into engagement with tool shank 20d radially securing the cutting tool assembly.

As will be seen from the above description, the tool clamp of this invention securely keys a cutting tool assembly against rotation relative to the tool spindle and includes provisions for axially and radially clamping the tool shank.

While any suitable provision may be made for actuating the tool clamp, a particular arrangement satisfactory for the dual spindle assembly described herein is illustrated in FIG. 1. As illustrated in FIG. 1, tool carriage 8 mounts a suitable collar 50 encircling the forward end of power shaft 14. Suitable brackets 50a projecting from the collar 50 mount a pivot pin 51 which in turn pivotally mounts a lever 52. The righthand end of lever 52, as viewed, mounts a roller 53 which in the position of lever 52, as illustrated, is in position slightly clearing actuating surface 36a of actuating rod 36 of the inactive spindle. The end of lever 52 on the opposite side of pivot pin 51 pivotally mounts a bar 54 which extends across the top of spindle 14. A piston 55 stroking in a suitable cylinder 56 on the bottom side of spindle shaft 14 is connected at its upper end to a bar 57 which also straddles the spindle shaft. The ends of bars 54 and 57 are connected by rods 58, only one of which is illustrated, to provide a balanced drive interconnecting piston 55 and lever 52. Piston 55 is illustrated in its uppermost position. In this position lever 52 is rotated clockwise to the position illustrated. Roller 53 clears the end 36a of actuator 36. The application of hydraulic fluid to the upper side of piston 55 exerts a downward force on the assembly affecting rotation of lever 52 counter-clockwise engaging roller 53 with the end of actuator 36 and applying sufficient force thereto to displace actuators 36 axially a distance sufficient to completely release the radial and axial tool shank clamp facilities of the tool clamp. In the arrangement illustrated with lever 52 in retracted position, clearances are sufficient to permit displacement of coupling members 10 with movement of the dual spindle assembly to position the respective spindles between active and inactive positions without interference of lever 52 or its appendages.

In a normal sequence of operations, assuming the inactive spindle to be loaded, provision is made for retracting member 12 of the separable clutch assembly to disengage the power spindle from the tubular spindle. Thereafter the dual assembly is rotated and indexed interchanging the spindles between active and inactive positions. While the next machine operation is proceeding with the newly positioned active spindle, the inactive spindle may now be unloaded and a new tool inserted therein. In accomplishing this, hydraulic power will be applied to the piston 55 to displace it downwardly to release the tool clamp permitting removal of the tool from the inactive spindle.

Although but one embodiment of this invention has been described herein, it will be appreciated that physical changes may be made in the arrangements described without departing from the spirit and scope of this invention. For instance, the bellows-shaped clamp has been described as a single piece configuration. Obviously, this arrangement may be formed as an assembly of separated or engaging arcuate sections, as well as an arrangement of discrete axial sections. Also, it will be appreciated that the particular details of the mechanisms for effecting operation of the radial and axial clamp facilities need not be precisely those which have been illustrated and described herein but may involve other equivalent mechanical features and details affording the character of motions and the modes of operations herein set forth.

What is claimed is:

1. A spindle assembly, comprising: a rotatable hollow spindle; a bellows-shaped spindle clamp disposed within the tool receiving end of said hollow spindle and extending axially thereof; said bellows clamp having inner peripheral edges which are radially displaceable to engage a tool shank; means adjacent the tool receiving end of said hollow spindle engaging the adjacent end of said bellows-shaped clamp preventing movement thereof out of said hollow spindle; a pair of hollow clamp members slidably mounted in spaced end-to-end relation in said hollow spindle, the end of one clamp member engaging the inner end of said bellows-shaped clamp; an actuator member slidably mounted in said one clamp member; lever means movably connected to said spindle and engaged and operated by axial displacement of said actuator member between positions engaging and releasing cooperating portions of a tool shank in said spindle; an actuator lever pivotally mounted on said actuator member and having opposite end portions engaging said clamp members, respectively; and means connected with the other of said clamp members for slidably moving said other clamp member from a retracted position toward said one clamp member.

2. A tool clamp, comprising: a hollow tool spindle having a tool receiving spindle end; a bellows-shaped tool clamp disposed within the tool receiving end of said hollow tool spindle and extending axially thereof; means adjacent the tool receiving end of said hollow tool spindle engaging the adjacent end of said bellows-shaped clamp preventing movement thereof out of said hollow tool spindle; a pair of clamp members slidably mounted in spaced end-to-end relation in said hollow tool spindle, one clamp member having an end portion engaging the inner end of said bellows-shaped clamp; means limiting movement of said one clamp member away from said bellows-shaped clamp; and mechanical linkage means interconnecting said clamp members and including movable tool engaging means for oppositely displacing said clamp members upon displacement of the other of said clamp members.

3. A tool clamp, comprising: a hollow tool spindle having a tool receiving spindle end; a bellows-shaped tool clamp disposed within the tool receiving end of said hollow tool spindle and extending axially therewith; means adjacent the tool receiving end of said hollow tool spindle engaging the adjacent end of said bellows-shaped clamp preventing movement of said bellows-shaped clamp out of said hollow tool spindle; a pair of members slidably mounted in spaced end-to-end relation within said hollow tool spindle and one member having an end portion engaging the inner end of said bellows-shaped clamp; actuator means connected to the other of said members; and mechanical linkage means interconnecting said members and including a movable member engageable with and restrained by a tool in said tool clamp for displacing said one member in a direction opposite to that of said other member.

4. A tool clamp, comprising: a hollow tool spindle having a tool receiving spindle end; a bellows-shaped tool clamp disposed within the tool receiving end of said hollow tool spindle and extending axially thereof; means adjacent to the tool receiving end of said hollow tool spindle engaging the adjacent end of said bellows-shaped clamp preventing movement thereof out of said hollow tool spindle; a pair of hollow clamp members slidably mounted in spaced end-to-end relation in said hollow tool spindle, one clamp member having an end portion engaging the inner end of said bellows-shaped clamp; means connected to said spindle limiting movement of said one clamp member away from said bellows-shaped clamp; a sliding actuator slidably mounted within said one clamp member; means including movable tool shank engaging members engaged by and operated by said sliding actuator for limiting sliding movement of said sliding actuator; a lever pivotally mounted on said sliding actuator and having opposite ends engaging said clamp members, respectively; and means coupled to the other of said clamp members for actuating said other of said clamp members.

5. A spindle assembly, comprising: a rotatable hollow spindle; a bellows-shaped spindle clamp disposed within the tool receiving end of said hollow spindle and extending axially thereof; said bellows-shaped clamp having inner peripheral edges which are radially displaceable to engage a tool shank; means adjacent the tool receiving end of said hollow spindle engaging the adjacent end of said bellows-shaped clamp preventing movement thereof out of said hollow spindle; a pair of clamp members mounted in spaced end-to-end relation in said hollow spindle, the end of one clamp member engaging the adjacent end of said bellows-shaped clamp, said one clamp member having an opening therethrough; a hollow actuator member slidably mounted in said one clamp member and having a slot therethrough aligned with said opening in said one clamp member, said hollow actuator receiving the shank extremity of a tool shank projecting through said bellows-shaped clamp; a lever pivotally mounted in said hollow spindle and having an end portion projecting through said opening in said one clamp member and through said slot in said actuator member to the interior of said actuator member, said end portion of said lever being engaged by the edges of said slot in said actuator member to be displaced between shank extremity releasing and engaging positions when said actuator member is in forward and retracted positions, respectively; an actuator lever pivotally mounted on said actuator member and having opposite end portions engaging said clamp members, respectively; and means connected to the other of said clamp members for resiliently maintaining said other clamp member in a retracted position.

References Cited in the file of this patent
UNITED STATES PATENTS

| | | |
|---|---|---|
| 2,562,134 | Smitka | July 24, 1951 |
| 2,573,166 | Sundt | Oct. 30, 1951 |
| 2,612,376 | Wollner | Sept. 30, 1952 |
| 2,801,858 | Spieth | Aug. 6, 1957 |